Figures 1, 2, 3, 4:
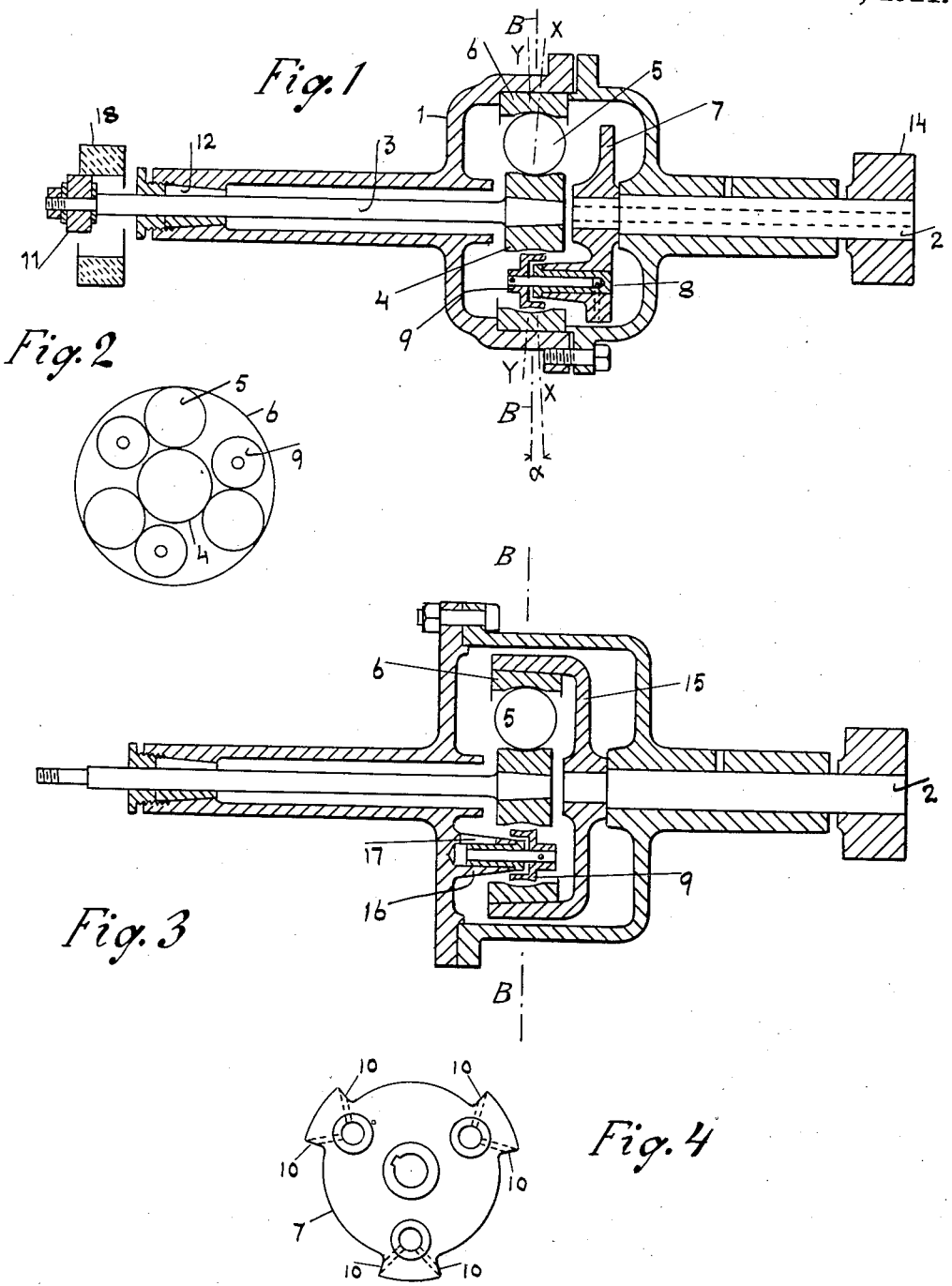

T. G. RENNERFELT.
FRICTION GEARING.
APPLICATION FILED JUNE 2, 1919.

1,399,442.

Patented Dec. 6, 1921.

WITNESSES:

INVENTOR
Ture Gustaf Rennerfelt

UNITED STATES PATENT OFFICE.

TURE GUSTAF RENNERFELT, OF STOCKHOLM, SWEDEN.

FRICTION-GEARING.

1,399,442.  Specification of Letters Patent.  Patented Dec. 6, 1921.

Application filed June 2, 1919.  Serial No. 301,239.

*To all whom it may concern:*

Be it known that I, TURE GUSTAF RENNERFELT, subject of the King of Sweden, and resident of Stockholm, in the county of Stockholm and State of Sweden, have invented certain new and useful Improvements in Friction-Gearing, of which the following is a specification.

My invention relates to improvements in friction gearing for transmission of power between two shafts through the medium of a plurality of rollers which are pressed by a pinion, fastened to one of the shafts, against a racering which surrounds the rollers.

In friction gearing of such type the pressure on the rollers is usually effected by means of a spring.

Now the object of my invention is to accomplish a friction gearing of the said type in which the spring shall not be needed. The invention is characterized mainly by this, that the pinion, the rollers and the racering are so arranged relatively to each other that the necessary pressure on the rollers is automatically obtained when the apparatus is put in operation. and the shaft which supports the pinion thereby becomes subjected to end thrust.

My invention is illustrated in the accompanying drawing, in which Figure 1 shows a section of the improved friction gearing arranged for the operation of a small emery wheel for the grinding of holes. Fig. 2 is a diagrammatic view. Fig. 3 shows a modified construction of the apparatus, and Fig. 4 shows a detail referred to in the specification as a yoke.

In the drawing 1 denotes the casing of the gearing, 2 one of the shafts journaled in the casing, 3 the other shaft or spindle to which the friction pinion 4 is fastened, 5 the rollers formed as complete balls and three in number. 6 denotes the racering, 7 a yoke fastened to the shaft 2 and provided with bushings 8, in which the rollers 9 whose faces are preferably concave are journaled. The bushing 8 extends partly within the roller in order that the slender journal of the roller shall not be subjected to bending. 10, 10 denote oil holes drilled in the yoke in oblique direction from the periphery of the yoke to the journals of the rollers for conveying oil to the interior of the bushing 8.

The emery wheel is denoted with 11 and the bearing in its vicinity with 12. A pulley fastened to the shaft 2 is denoted with 14. A piece to be ground internally is indicated by the ring 18.

The above described apparatus operates in the following manner.

It is mounted in a suitable grinding machine, and when the shaft 2 is put into rotation, the yoke 7 together with the rollers 9 will rotate with the shaft 2 and will drive the balls 5 so that they roll upon the racering 6 and rotate around the shaft 2. If now there is sufficient pressure between the pinion, and balls and the racering, the pinion 4 will be rotated together with its shaft 3 in the same direction as the shaft 2 and with greater speed than the said shaft. The requisite pressure is transmitted to the pinion 4 from the emery wheel 11 through the shaft 3 and by virtue of the pull or thrust which is caused by the feeding of the emery wheel forth or back along the piece 18 which is being ground. During this operation the contact between the balls and the racering will take place alternately on either side of the middle plane B of the racering—that is, when the shaft 3 is subjected to thrust the balls will occupy the position shown in Fig. 1 and make contact with the racering at a place indicated by the lines X. On the other hand when the shaft 3 is subjected to a pull the balls will roll over on the other side of the middle plane B and thus make contact with the racering at a place indicated by the lines Y. The angle $\alpha$ will generally be of small magnitude, and the apparatus may be so constructed that $\alpha$ will be zero or very nearly zero, in which case an emery wheel 11 may be used of considerably larger diameter than that of the pinion, the pressure between balls and pinion being sufficient to effect the power transmission even though the thrust on the shaft 3—due to the friction between the wheel 11 and the ring 18—be very small.

The centrifugal force acting on the balls will tend to keep them in contact with the racering at its greatest diameter, that is in the middle plane B. The result is, that when the apparatus is used for hole grinding—and if the angle $\alpha$ is of an appreciable magnitude—the balls will lose contact with the pinion every time the feed changes direction which will occur when the emery wheel is at either end of the hole. The shaft 3 will then cease to rotate—or its speed of rotation will be much decreased—and thereby will be obviated the fault, common in all previous hole grinding machinery in which the grinding wheel is driven at constant speed, that the end of the hole is ground to a larger diameter than the middle of the hole.

The lubrication of the journals 8 is effected through the holes 10. The casing contains a quantity of oil, which upon rotation of the yoke will rise through the holes 10 and enter the bushing 8. Two holes 10, 10, drilled in different directions, are provided for each journal so as to secure its lubrication whether the shaft 2 rotates in one or in the other direction.

The shaft 2 is preferably hollow, as indicated in dotted lines in Fig. 1 in order to faciliate the removal or exchange of the spindle 3.

The running faces of the pinion and the racering have the form customary in a ball bearing of the two point type, and the balls together with the racering constitute a ball bearing for the shaft 3. The racering and the pinion are preferably made of hardened steel, but in some cases the racering may be formed in one piece with the cast iron casing, and the pinion may be formed integral with the shaft 3.

The above described apparatus may be used with advantage for other purposes than for driving a grinding spindle. For instance, it may be employed for driving a centrifugal pump at a high rate of speed, in which case the pull in the shaft 3, caused by the suction of the pump, will be sufficient to create upon the pinion 4 the pressure necessary for rotating the pump. Or for another instance, the apparatus may be used for driving a small drill fastened to the shaft 3, the shaft 2 being, for instance, direct connected to the spindle of a drillpress. It is also evident that the apparatus may be used for reducing the rotative speed of a shaft, just as well as for increasing it.

As soon as the machine ceases to work, the axial force on the shaft 3 disappears, thereby decreasing the pressure between pinion 4 and balls 5, so that at no load this pressure is quite insignificant.

In the modified construction shown in Fig. 3 the racering 6 is mounted within a cap 15, fastened to and rotating with the shaft 2. The rollers 9 are then journaled in the bosses 16 extending from the casing. The lubrication of the journals is effected through openings 17 in the bosses, in which openings the splashing oil is collected. In this modified construction the balls do not rotate around the shaft, but only around axes passing through their own centers, and the balls are therefore not exposed to any centrifugal force. In other respects this modified construction operates substantially in the same manner as the construction shown in Fig. 1.

What I claim is:—

1. In a friction gearing for transmission of power between a shaft and a spindle the combination of a friction pinion mounted on the spindle, a racering having a concave running face, a plurality of rollers between the pinion and the racering, means fastened to the spindle for transmitting pressure to the pinion and forcing it against the rollers, and means carried by the shaft for causing the rollers to roll on the racering, the rollers being arranged to make contact with the racering at the largest diameter of its running face.

2. In a friction gearing for transmission of power between a shaft rotating at low speed and another shaft rotating at a higher speed, the combination of a friction pinion fastened to the second shaft, a racering, a plurality of rollers arranged to be pressed between the pinion and the racering, and means connected to the first shaft for driving the rollers on the racering, the pressure from the pinion against a roller being directed at right angle to the center line of the pinion.

3. Friction gearing embracing a racering, a plurality of rollers arranged to roll on the racering, a shaft, a pinion fastened to the shaft and arranged to be pressed against the rollers, the rollers constituting the sole means of support of the pinion, a second shaft, a yoke connected with the second shaft, and a plurality of rollers journaled in the yoke and arranged to drive the first said rollers on the racering and to sustain the total pressure between them and the yoke, the pressure between the pinion and a roller directed at right angle to the center line of the pinion.

4. In a friction gearing for transmission of power between a shaft rotating at low speed and another shaft rotating at higher speed, the combination of a friction pinion fastened to the second shaft, a racering, a plurality of balls between the pinion and the racering, means fastened to the second shaft for transmitting pressure to the pinion and forcing it against the balls, and means fastened to the first shaft for causing the balls to roll on the racering, the balls being arranged to make contact with the racering on either side of the middle plane of the racering.

5. In a frictionally driven grinding apparatus the combination of a casing, a shaft journaled therein, a grinding wheel fastened to one end of the shaft, a pinion fastened to the other end, a racering within the casing, a plurality of balls between the pinion and the racering constituting the sole means of support of the pinion, and a second shaft journaled in the casing and operatively connected with the balls, the grinding wheel being arranged to cause a thrust upon the first shaft so as to press the pinion against the balls, and the pressure on a ball being directed substantially at right angle to the center line of the pinion.

6. In a friction gearing for transmission of power between two shafts, the combination of a pinion fastened to one of the shafts, a racering, a plurality of balls arranged to be pressed by the pinion against the racering, a yoke fastened to the other shaft, and a plurality of rollers journaled in the yoke and arranged to sustain pressure from the balls, oil holes being formed in the yoke in oblique direction from the periphery of the yoke to the journals of the rollers.

7. In a friction gearing the combination of a pinion, a racering, a plurality of convex rollers pressed between the pinion and the racering, the pressure on the rollers being directed at right angle to the center line of the pinion, a spindle connected with the pinion, a shaft, a yoke fastened to the shaft, and secondary rollers journaled in the yoke and making contact with the first said rollers.

8. In a friction gearing for transmission of power between a shaft and a spindle the combination of a pinion fastened to the spindle, a racering, a plurality of rollers arranged to be pressed by the pinion against the racering, a yoke fastened to the shaft, and a plurality of secondary rollers journaled in the yoke and arranged to sustain the total pressure between the yoke and the first said rollers, two oilholes being formed in the yoke from the periphery of the yoke to each journal of the secondary rollers.

9. In a friction gearing the combination of a pinion, a racering, a plurality of rollers pressed between the pinion and the racering, the pressure on a roller directed substantially at right angle to the center line of the pinion, a spindle connected with the pinion, a shaft, a yoke fastened to the shaft, secondary rollers journaled in the yoke and making contact with the first said rollers, and means for automatically lubricating the journals of the secondary rollers.

10. In a friction gearing for transmission of power the combination of a spindle, a friction pinion fastened thereto, a concave racering, a plurality of convex rollers between the pinion and the racering, means carried by the spindle for transmitting pressure to the pinion and forcing it against the rollers, a shaft, a yoke fastened to the shaft, and a plurality of secondary rollers journaled in the yoke and arranged to sustain the total pressure between the first said rollers and the yoke, the first said rollers arranged to make contact with the racering on either side of the middle plane of the racering.

11. In a friction gearing the combination of a concave pinion, a racering, a plurality of convex rollers pressed between the pinion and the racering, the pressure on a roller directed substantially at right angle to the center line of the pinion, a spindle connected with the pinion, a shaft, a yoke fastened to the shaft, and means for minimizing friction between the rollers and the yoke.

12. Friction gearing embracing a casing, a spindle journaled therein, a pinion having a concave rolling face fastened to the spindle, a concave track within the casing, a plurality of convex rollers in contact with the pinion and with the track, the pinion arranged to be pressed in axial direction against the rollers, the pressure between the pinion and a roller being directed substantially at right angle to the center line of the pinion, a shaft journaled in the casing, a yoke fastened to the shaft, and a plurality of secondary rollers journaled in the yoke and arranged to sustain the total pressure between the yoke and the first said rollers.

Signed at Stockholm, in the county of Stockholm and State of Sweden, this 9th day of May A. D. 1919.

TURE GUSTAF RENNERFELT.

Witnesses:
 H. M. LÖF,
 GRETA PRIM.